United States Patent [19]

Gomberg

[11] Patent Number: 4,957,573
[45] Date of Patent: Sep. 18, 1990

[54] METHOD FOR PLACING AN INNER TUBE INTO A TIRE LINED WITH SEALANT

[76] Inventor: Edward N. Gomberg, 572 River St., Chattanooga, Tenn. 37405

[21] Appl. No.: 387,675
[22] Filed: Jul. 31, 1989
[51] Int. Cl.$^5$ .................. B29C 73/22; B29C 73/00
[52] U.S. Cl. ............................... 156/115; 156/121; 152/503; 152/506
[58] Field of Search ............... 156/115, 121; 152/502, 152/503, 504, 506, 507, 508, 510, 511, 512

[56] References Cited

U.S. PATENT DOCUMENTS 4,396,053  8/1983  Davis ................................. 152/504
4,664,168  5/1987  Hong et al. ........................ 152/504

Primary Examiner—Michael W. Ball
Assistant Examiner—Gregory J. Wilber
Attorney, Agent, or Firm—Lyon & Lyon

[57] ABSTRACT

A self-healing tire containing an inner tube is obtained by a method comprising coating either the surface of the tube or the inner surface of a tire casing with a tacky, non-flowing sealant material. Prior to insertion of the inner tube, the surface of the sealant or the opposing surface of the tube or casing or both are coated with a anti-tack material, such as a plasticizer for the sealant. The anti-tack material renders the sealant non-tacky for a period of time long enough for insertion and inflation of the tube. However, the anti-tack material allows the sealant surface to become tacky again thereby adhering the tube to the casing and providing for sealing of the tube when it is punctured.

8 Claims, 1 Drawing Sheet

METHOD FOR PLACING AN INNER TUBE INTO A TIRE LINED WITH SEALANT

FIELD OF THE INVENTION

The present invention relates to methods and compositions for placing an inner tube into a tire casing having a tacky, non-flowing sealant material on the interior surface and the resulting tire.

BACKGROUND OF THE INVENTION

The inner surface of tire casings has been coated with a tacky, non-flowing sealant material which provides or tends to provide a sealing of the tire around an object which punctures the tire. A method for lining a tire with such a sealant is disclosed in U.S. Pat. No. 4,418,093. A particularly successful type of tire lining material is a tacky self-healing elastomer. The use of such elastomers has been limited to tubeless type tires. By its very nature, a self-healing elastomeric lining, adhered to the inner tread surface and sidewall of a tire casing, will have a tacky surface similar to the sticky surface of contact paper. It is this tackiness that allows the elastomer to heal and prevent the loss of air from a lined pneumatic tire when it is penetrated by a sharp object. The elastomer bonds to the surface of the penetrating object and thereby closes off any opening through which the pressurized air in the casing can escape. When the object is withdrawn, the tacky walls of the elastomer close upon themselves and fuse. Thereby, again preventing the escape of the compressed air in the tire.

Prior to this invention, only tubeless type tires could be lined with self-healing elastomers. It is virtually impossible to install and inflate a rubber inner tube into a tire casing that is lined with a tacky adhering material. A tube installed in such a manner would not inflate uniformly, but rather it would distort the lining by dragging it out of shape as various tube-to-liner adhered sections moved under filling pressure to conform to the tire casing. Such a distortion would create an imbalance that would make the tire useless in commerce.

Accordingly, one object of the present invention is to provide an improved process for lining a tire with a tacky elastomeric material and using an inner tube in that tire. Another object of the present invention is to provide a material which will temporarily convert the surface of a tacky elastomeric tire lining material to a non-tacky material.

Yet another object of the present invention is to provide an improved tire comprising a casing, tacky elastomeric material on the inner surface of the casing and a tube disposed within the casing.

These and other objects of the invention are accomplished by using a process and material which makes it possible to provide for a tire containing an inner tube which also contains a tacky elastomeric sealant. Such a tire is obtained by first applying the elastomeric sealant to either the inner surface of the tire casing or the outer surface of the inner tube. After application of the elastomeric sealant, an anti-tack material, a plasticizer that will migrate from the surface into the body of the elastomer, may be applied to the surface of the elastomer. The elastomer can be coated with the anti-tack material or plasticizer by painting, spraying, spin application, etc. The inner tube can then be inserted and inflated without undue adherence between the inner tube and casing.

In another typical application, the inner surface of the tire casing is coated with a tacky elastomer sealant. The rubber inner tube is then coated with the anti-tack material or plasticizer material. The inner tube, thus lubricated with anti-tack material or plasticizer, can then be easily inserted into the lined tacky tire casing and inflated without any distortion of the liner. After a reasonable period of time, depending upon the rate of migration under pressure of the plasticizer, the surface of the liner will again become tacky and bond to the inner tube. This method creates a system wherein the self-healing elastomeric liner is bonded both to the tire casing and the inner tube and will resist the loss of pressurized air when the system is punctured.

DESCRIPTION OF THE PREFERRED EMBODIMENT

Figure 1:
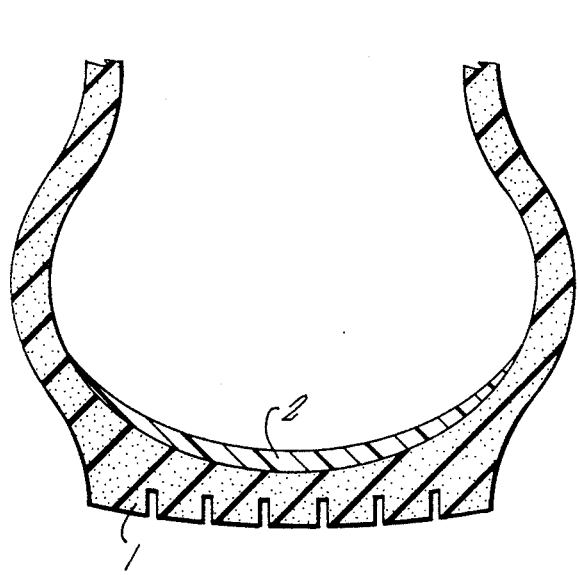
FIG. 1 discloses a cross-section of a tire casing with a liner coating the inner surface of the casing.

The tire casings, useful in this invention, can be a casing made of any suitable tire casing material. For example, tire casings of rubber, synthetic rubber and various polymeric materials may be used. The casings may be belted or reinforced with materials such as steel and natural and synthetic fibers.

The tire lining material or sealant suitable in this invention include tacky elastomeric tire liner materials.

The tire liner or sealant of this invention can be any non-flowing sealant material which has a tacky surface and thus makes it difficult to install a inner tube into the tire casing because of the tendency of the inner tube to adhere to the surface of the sealant. Non-flowing means that the viscosity is low enough so that the sealant does not flow appreciably under conditions of application of the sealant. The sealant can be any of a variety of materials. A particularly suitable material is a polyurethane elastomeric material. The preferred elastomeric urethane material is TYRLINER, marketed by Synair Corporation, 2003 Amnicola Highway, Chattanooga, Tenn. 37406. Suitable liner or sealant materials include those which have a tacky surface which is rendered non-tacky by the application or coating of an anti-tack material or plasticizer on the surface of the sealant. The sealant and anti-tack material or plasticizer are selected so that in a reasonable amount of time, from a tire processing point of view, the anti-tack material or plasticizer sufficiently migrates into the surface of the sealant so that the surface of the sealant becomes sufficiently tacky to firmly adhere the inner tube and effectively perform a sealing operation. Given the principles of the invention as set forth herein, it is within the skill of the art to select suitable materials and combinations of sealant materials and anti-tack or plasticizer materials as defined below.

The anti-tack material or plasticizer is, in general, any material which will render the tacky surface of the sealant non-tacky for a period of time sufficient to permit installation of the inner tube into the tire casing, but will permit the sealant material to return to its tacky condition in a commercially reasonable period of time in order to permit adhering of the inner tube to the surface of the sealant and allow the sealant to perform its normal function. The anti-tack materials of this invention permit the sealant material to return to a tacky condition within about one hour or less when the inner tube is pressurized. Suitable anti-tack materials include plasticizers such as plasticizers for elastomeric polyurethanes. Such plasticizers include simple hydrocarbon molecules which render non-tacky the surface of the sealant material but are of such a size that they migrate into the surface of the sealant with time thus allowing the sealant surface to return to its normally tacky condition. It will be understood that materials which act in an equivalent manner, e.g., upon initial application reduce the tackiness of the sealant surface but in a reasonable amount of time allow the sealant surface to return to its normal condition, are suitable anti-tack materials suitable for this invention. Suitable anti-tack or plasticizer materials include napthinic oils, tricresolphosphate and dioctylphthalate. These plasticizers are given as examples of the wide range of known plasticizing materials which can be used in accordance with this invention.

In the application of the sealant material, the material can be painted, sprayed or otherwise coated. A particularly suitable method of applying the sealant material is disclosed in U.S. Pat. No. 4,418,093, issued Nov. 29, 1983, the disclosure of which is incorporated herein by reference. Such a coated tire is illustrated in FIG. 1. The tire casing is generally indicated by the reference numeral 1 and the sealant coating by the reference numeral 2.

Figure 2:
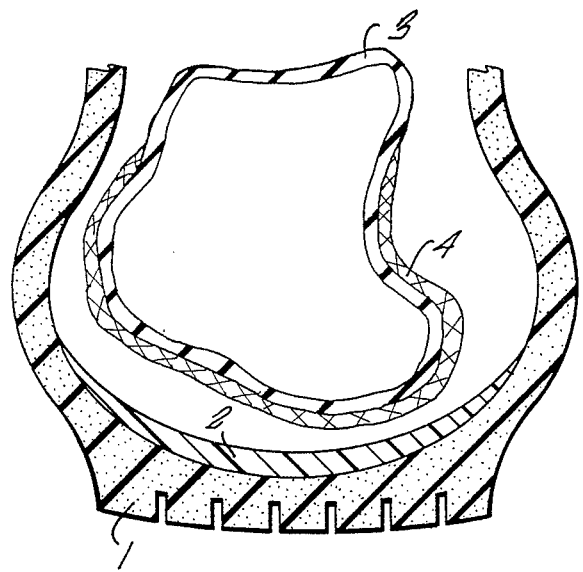
FIG. 2 is a cross-section of a tire casing showing a lined casing with an inner tube inserted, the inner tube containing a coating of anti-tack or plasticizing material on its surface.

After application of the sealant, 2, to the inner surface of the casing or outer surface of the inner tube, and immediately before introduction of the inner tube, the outer surface of the tube may be coated with the anti-tack plasticizer material to form the structure illustrated in FIG. 2. There, the casing, 1, sealant, 2, tube, 3, and outer coating of plasticizer material, 4, are shown. The anti-tack material may be applied to either the outer surface of the inner tube to be inserted into the casing or to the surface of the sealant material or both. The plasticizer material can be applied by painting, spraying or any other suitable method of application. The layer of anti-tack or plasticizer material makes it possible to insert the inner tube into the lined tacky tire casing and inflated without any distortion of the liner. After a commercially reasonable period of time, the surface of the liner or sealant will again become tacky and bond to the inner tube.

Figure 3:
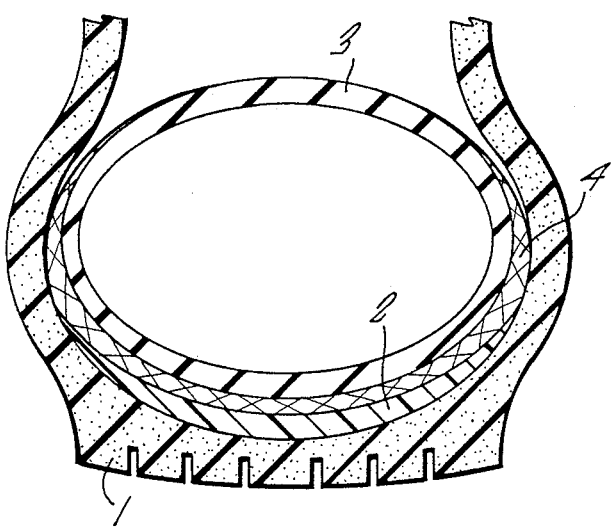
FIG. 3 illustrates a cross-section of a tire in accordance with this invention comprising a casing, a layer of elastomeric lining material, anti-tack or plasticizer in contact with the elastomeric lining material and the outer surface of the inner tube in contact with the anti-tack or plasticizer.

FIG. 3 illustrates a cross-sectional view of the inflated tube as it is initially placed inside of the casing. The layer of anti-tack or plasticizer material, 4, exists at the inner face of the tube and sealant material to ensure that the tube does not adhere to the sealant and cause deformation of the tube within the casing. With time, and under the pressure of inflation, the anti-tack plasticizer material will migrate into the surface of the sealant or otherwise permit the surface of the sealant to again become tacky and bond to the inner tube.

Figure 4:
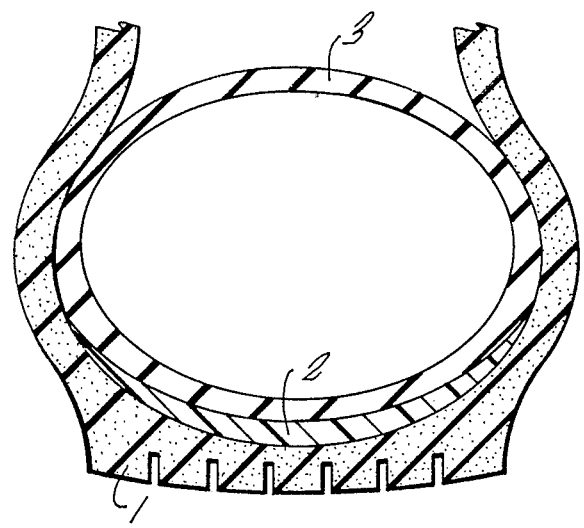
FIG. 4 illustrates the tire, in cross-section, ready for use with a casing, an intermediate layer of elastomeric sealant and an inner tube adhering to the sealant.

This method creates a system whereby the self-healing sealant liner is bonded to both the tire casing and the inner tube as illustrated in FIG. 4 which is a cross section of the tire containing a casing, 1, a sealant liner, 2, and an inner tube, 3, which is bonded to the sealant liner.

It is important that the anti-tack material only have a temporary effect. Thus, the surface of the tire liner cannot be coated with a talcum powder, or release agent or a thin film of plastic to permit the inner tube to slide into position as it is being inflated. If a liner is separated from the inner tube by a non-adhering thin film, air under pressure will escape through the cut in the inner tube and the nonadhering surface between the tube and the lining. According to the present invention, such an escape of air does not exist. When a sharp object such as a nail punctures a portion of the casing and inner tube having the tacky liner adhered to it, the tacky liner material clings to the penetrating object and prevents air from escaping. When the penetrating object is withdrawn, the puncture in the inner tube is sealed by the liner material causing the inner tube to remain air tight. If the inner tube is not adhered to the sealant or liner, loss of air will result when a puncture occurs.

The invention is further illustrated by the following example.

EXAMPLE

An AMERI-WAY XT (steel belted radial tire) size P195/75R14 was lined by the process disclosed in U.S. Pat. No. 4,418,093 with TYRLINER, a urethane liner sold by Synair Corp. Four one sixteenth inch diameter holes were drilled ninety degrees apart on both sides of the tire casing near the bead area but above the self-healing liner to allow air that might become entrapped between the tire casing and the inner tube as it was being inflated, to escape. A BF Goodrich Silvertown Passenger Tube was coated with Sunthene 410 rubber processing oil and placed inside the lined tire. The tube was then inflated to a pressure of 35 psi.

The following day the pressure was again tested, adjusted for the reduction of one psi of air pressure and subjected to a tire puncture test. Three different size nails (8D, 16D and 20D) were inserted and removed from four locations on the tire tread area spaced 90 degrees apart. A total of twelve punctures were made in the inflated tire and inner tube.

The tire was checked for air leaks by applying a soapy water solution around the bead area and the tread area where the tire had been punctured. No air leaks were detected.

The tire wheel assembly was then balanced and mounted on an indoor test wheel for dynamic testing. The tire was stabilized at the ambient test room temperature of 100 degrees F., loaded to 1400 pounds (the rated load for this tire size) and run at 65 mph for 11 hours. Air pressure increased to 41 psi at the stabilized tread temperature of 165 degrees F. No loss of air pressure was detected at the end of the test run. The tire was then dismounted from the wheel to observe the condition of the liner. On inspection, it was found that the rubber inner tube was uniformly adhered to the self healing liner.

The tube was cut along the edge of the liner and the non-adhered portion of the inner tube removed. Since the tacky liner surface was now covered with the adhered portion of the inner tube, it was possible to insert a new inner tube and reinflate the tire.

Again the tire was punctured with nails and tested for leaks with a soapy water solution. There were no apparent leaks where the tire had been punctured in the tread area. The liner adhered to the tire casing was preventing the air from escaping. But when the soap solution was applied around the bead area, it was evident that air was escaping from the space between the two inner tubes where there was no adhesion. This second test further served to confirm that adhesion must occur between inner tube and liner to prevent the loss of compressed air when the tire is punctured.

It can be seen from the foregoing description, drawings and example that the present invention provides a method for making sealed tires applicable to tires containing tubes. That variations in the actual methods and articles described above will be useful, will be apparent to those skilled in the art. Therefore, the present invention is to be considered limited only by the appended claims.

I claim:

1. A method of placing an inner tube in a tire casing wherein either the inner tube or the tire casing has been lined with a layer of tacky sealant material comprising applying a layer of anti-tack material on to the sealant, or to a surface opposing the sealant, or both, said anti-tack material rendering the sealant nonadhering with respect to the opposing surface for a sufficient period of time to allow proper placement and inflation of the inner tube within the casing but permitting the sealant to regain its tacky surface after inflation of the inner tube.

2. The method of claim wherein the sealant material is a polyurethane elastomer.

3. The method of claim 1 wherein the antitack material is a plasticizer.

4. The method of claim 3 wherein the plasticizer is a processing oil.

5. The method of claim 3 wherein the plasticizer is dioctylphthalate.

6. The method of claim 3 wherein the plasticizer is tricresolphosphate.

7. The method of claim 1 wherein the sealant is applied to an inner surface of the tire casing.

8. The method of claim 1 wherein the sealant is applied to a surface of the inner tube.

* * * * *